(12) United States Patent
Demon

(10) Patent No.: US 9,844,187 B2
(45) Date of Patent: Dec. 19, 2017

(54) DENSITY CONTROL SYSTEM

(71) Applicant: CNH Industrial America LLC, New Holland, PA (US)

(72) Inventor: Frederik Demon, Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 234 days.

(21) Appl. No.: 14/443,923

(22) PCT Filed: Nov. 18, 2013

(86) PCT No.: PCT/EP2013/074047
§ 371 (c)(1),
(2) Date: May 19, 2015

(87) PCT Pub. No.: WO2014/076271
PCT Pub. Date: May 22, 2014

(65) Prior Publication Data
US 2015/0272006 A1 Oct. 1, 2015

(30) Foreign Application Priority Data
Nov. 19, 2012 (BE) .................. 2012/0778

(51) Int. Cl.
*A01F 15/08* (2006.01)
*A01F 15/04* (2006.01)
*B30B 9/30* (2006.01)
*G05B 15/02* (2006.01)

(52) U.S. Cl.
CPC ........ *A01F 15/0825* (2013.01); *A01F 15/042* (2013.01); *B30B 9/3007* (2013.01); *B30B 9/3025* (2013.01); *G05B 15/02* (2013.01)

(58) Field of Classification Search
CPC .... A01F 15/0825; A01F 15/042; A01F 15/14; A01F 15/145; A01F 15/04; A01F 15/08; B30B 9/3007; B30B 9/3025; G05B 15/02
USPC .................................................. 100/43, 179
See application file for complete search history.

(56) References Cited

U.S. PATENT DOCUMENTS

| 5,123,338 | A | | 6/1992 | Mathis |
| 5,558,014 | A | | 9/1996 | Robinson |
| 6,026,741 | A | * | 2/2000 | Lippens ............. A01F 15/0825 100/191 |
| 6,101,932 | A | | 8/2000 | Wilkens |
| 6,112,507 | A | | 9/2000 | Mesmer |

(Continued)

FOREIGN PATENT DOCUMENTS

EP 0857414 A1 8/1998

*Primary Examiner* — Jimmy T Nguyen
(74) *Attorney, Agent, or Firm* — Patrick M. Sheldrake

(57) ABSTRACT

Density control system for an agricultural baler having a baling chamber including a plurality of walls with at least one movable wall section, an intake duct leading into the baling chamber, and a plunger for compressing charges of crop material to a package in the chamber, an actuator for adjusting the position of the at least one movable wall section in response to an output of the density control system to vary the density of said package, wherein the density control system has a sensor for measuring the position of the at least one movable wall section, a comparator for comparing said position with a threshold position and a decision module configured to stop the movement of the actuator means when the position exceeds the threshold position.

8 Claims, 3 Drawing Sheets

(56) References Cited

U.S. PATENT DOCUMENTS

| | | | |
|---|---|---|---|
| 6,257,131 B1 * | 7/2001 | Wilkens | A01F 15/0825 100/192 |
| 6,457,405 B1 | 10/2002 | Lippens et al. | |
| 6,651,416 B2 | 11/2003 | Trelstad et al. | |
| 7,331,279 B2 | 2/2008 | Biziorek et al. | |
| 7,493,854 B2 | 2/2009 | Etherton et al. | |
| 7,918,158 B2 | 4/2011 | Viaud | |
| 8,826,816 B2 | 9/2014 | Vergote | |
| 2007/0234908 A1 | 10/2007 | Hines et al. | |
| 2013/0180417 A1 * | 7/2013 | Vandamme | A01F 15/0825 100/35 |
| 2014/0090568 A1 * | 4/2014 | Missotten | A01F 15/08 100/346 |
| 2014/0224135 A1 * | 8/2014 | Van Amstel | A01F 15/0825 100/3 |

* cited by examiner

DENSITY CONTROL SYSTEM

CROSS-REFERENCE TO RELATED APPLICATIONS

This application is the US National Stage filing of International Application Serial No. PCT/EP2013/074047 filed on Nov. 18, 2013 which claims priority to Belgium Application BE2012/0778 filed Nov. 19, 2012, each of which is incorporated herein by reference in its entirety.

FIELD OF THE INVENTION

The present invention relates to agricultural balers which produce rectangular bales and more particularly to an arrangement of a sensor which is used for controlling the density of the produced bale.

BACKGROUND OF THE INVENTION

In an agricultural baler, material such as hay, straw, silage or similar crop material that previously has been cut, windrowed or swathed, is picked up from the field by a pick-up unit, fed into a duct and loaded into an elongated bale chamber. A plunger which reciprocates in the front portion of the baling chamber compresses the newly introduced material against the previously introduced material into a parallelepipedic package, and at the same time, gradually advances the package towards the outlet of the bale chamber. As the package reaches a predetermined length as determined by a metering device, a knotter device is actuated to wrap cord, twine or other flexible binding material around the package and to secure the ends of the binding material together to form a stable bale.

Commonly the baling chamber has at least one movable wall portion whereof the position can be changed to vary the outlet section of the baling chamber. An enlarged outlet section reduces the forces needed to advance the bales in the baler and hence diminishes the density of the newly formed bales. Otherwise, a reduced section substantially increases the friction forces of the bale along the chamber and thereby raises the compression forces exerted by the plunger on the crop material. Accordingly the density of the new bales will increase.

It is known in the art to adjust the position of the movable wall in accordance with a signal of a load sensor in order to produce bales having a predetermined density. Typically the position of the rear portion of the baling chamber is controlled by a hydraulic cylinder in response to a sensor monitoring the forces exerted by the plunger. EP-A-0 379 230 shows a baler having a plunger which is connected by a pair of wrist pins to a pair of connecting rods, which in turn are linked to a pair of rotating cranks on a gearbox. The wrist pins are equipped with strain gauges for monitoring the forces applied by the plunger. As the full compression force on the plunger is transferred upon the wrist pins, they have to be of a sturdy design. However, some deformation must be allowed to make the sensor furnish discernible signals which can be used in adjusting the outlet area of the baling chamber.

Other sensor embodiments are illustrated in U.S. Pat. No. 5,123,338. According to one embodiment, a substantially mechanical sensor reacts to the forces applied by the plunger on the connecting rod. The result is a mere ON-OFF signal which provides no intermediate data on the actual plunger load. Such output cannot be used for a refined adjustment of the bale density. The compression level achieved by this control system has to be adjusted by mechanical means on the baler itself.

Another embodiment in the same document shows a load sensor arranged between the gearbox driving the plunger and the main frame of the baler. The reaction forces of the plunger on the gearbox are measured by strain gauges affixed to an arm which is interconnecting the top of the gearbox and the frame. The output signal is variable such that it can be used for setting a wide range of densities.

Another sensor embodiment is described in EP1066748. In this embodiment, the force exerted by the plunger on the package of crop material is measured. The operator is informed of the measurement results, and can choose to adjust the position of the movable wall sections in the baling chamber. Thereby, the relationship between the force needed to push the package further into the baling chamber and the density of the package is used to steer the actuators moving the movable wall parts. This way of steering enables to obtain a relatively accurate regulation of the density of the package.

Recently, high density balers are developed, which are provided to push the crop material into a package with a density that is higher than densities that are obtainable via currently available balers. Therefore, these high density balers are provided with more heavy machinery.

A problem arises when using conventional density control systems together with such more heavy machinery. In a normal working mode, a movable wall section has on one side an actuator pushing the wall section inward with a predetermined force, and on the other side a package of crop material providing backpressure to this force. In startup mode however, the backpressure is absent and the heavy machinery of a high-density baler proved to be powerful enough to damage the movable wall section. Also during use, the crop material could be unequally spread through the baling chamber so that the backpressure at the movable wall section is not enough to counter the force exerted by the actuator in an attempt to reach a predetermined density, so that the actuator damages the movable wall section. Existing density control systems do not provide a solution to this problem. A density control system according to the prior art can consequently not be used in a high density baler.

SUMMARY OF THE INVENTION

It is an object of the current invention to provide a density control system that can be used in a high density baler.

To this end, the invention provides in a density control system for an agricultural baler, which comprises a baling chamber comprising a plurality of walls including at least one movable wall section, means for introducing charges of crop material into the baling chamber and a plunger for compressing the charges to a package of the crop material in the chamber, actuator means for adjusting the position of the at least one movable wall section in response to an output of the density control system in order to vary the density of said package, characterized in that the density control system comprises a sensor for measuring the position of the at least one movable wall section, a comparator for comparing said position with a threshold position and a decision module configured to stop the movement of the actuator means when the position exceeds the threshold position.

In the prior art, the movable wall section has been consequently force-based-steered, meaning that the actuators are steered to change the position of the movable wall section depending on force measurements in the baling chamber (and possibly also further environmental properties such as humidity). Thereby, the actuators are steered to move the movable wall section inward in case the measured force is below a threshold, and to move the section outward in case the measured force is above a threshold. The invention adds a position-based-steering to the conventional force-based-steered movable wall section and thereby prevents the latter from being moved over a predetermined position. Thereby, a further dimension is added to the control system, namely the system can control the movable wall section not only based on force, but also based on position of the wall section. This added control dimension allows the density control system to be programmed not to move the movable wall section over its final position thereby damaging the wall. This added control dimension further provides a surprising effect in that the outer shape of the bales pressed in the baler can be influenced. The relative position of the movable wall section influences the resistance against propulsion of the bales in the baling chamber, and is therefore related to the density of the bales. However the absolute position of the movable wall section has an effect on the outer shape of the bales, namely one movable wall section being moved inward might result in an asymmetrical force exerted on the bale inside the baling chamber resulting in a bale with a bended shape. Since the position of the movable wall section is measured and used to control the further movement of this wall section, the shape of the bale can be influenced.

Preferably, the threshold position represents a predetermined final inward position of the movable wall section. This feature solves the problem associated with a conventional density control system whereby the movable wall section is pushed further than its most inward position thereby damaging the baling chamber. By programming a final inward position as threshold position which is monitored by the density control system (via the comparator and the decision module), this situation is avoided because the movement of the actuator is stopped once the final inward position is reached. The position measurement and corresponding comparator and decision module provide a simple technical solution to allow the density control system to work correctly according to established techniques but without the risk of the density control system damaging the movable wall section.

Preferably, the density control system further comprises a load sensor measuring the reaction force of the crop material on a segment of the baling chamber and generating an output indicative of said reaction force, and comprising a steering module for steering the actuator means to move the at least one movable wall section in response to said output. Thereby, the relationship between reaction force exerted by the package on the baling chamber and the density of the package is used to obtain a predetermined density of the package by exerting a higher force when the reaction force is lower than predetermined and by decreasing the force when the reaction force is higher than predetermined. Thereby, the position of the movable wall part is constantly monitored and compared with a threshold position so that the actuator means moving the movable wall section can be stopped once the threshold position is reached.

Preferably, the agricultural baler is a high density square baler. In a conventional baler, the plunger is provided to exert a force on the crop material of around 400 kN. The plunger of a high density baler is constructed and powered in a manner so that forces of 450 kN can be exerted on the crop material. Preferably, a high density baler plunger can exert 600 kN of force, most preferably around 700 kN of force on the crop material. A high density baler can therefore be defined as a baler wherein the plunger is provided to exert at least 450 kN of force on the crop material, preferably at least 500 kN, more preferably at least 550 kN, most preferably at least 600 kN of force.

The invention further relates to an agricultural baler having a baling chamber comprising a plurality of walls including at least one movable wall section, means for introducing charges of crop material into the baling chamber and a plunger for compressing the charges to a package of the crop material in the chamber, actuator means for adjusting the position of the at least one movable wall section in response to an output of a density control system according to any one of the previous claims, in order to vary the density of said package. This agricultural baler is, by the presence of the density control system with position-based-steering, more flexible in use, resulting in a baler which can be further automated than existing balers. For example, the baler according to the invention can be protected against movement of the movable wall section of the baling chamber further than its final position, to prevent damage. The baler can be programmed to produce bales with a predetermined shape, as is explained above. Furthermore the presence of the density control system enhances the automation of the baler in that the density of the packages is controlled without the operator having to indicate when force is to be exerted on the movable wall section.

The invention also comprises a method for controlling the density of packages of crop material in an agricultural baler, which comprises:
a baling chamber comprising a plurality of walls including at least one movable wall section, means for introducing charges of crop material into said baling chamber a plunger for compressing the charges to a package of the crop material in the chamber,
actuator means for adjusting the position of the at least one movable wall section in response to an output of a density control system in order to vary the density of said package; the method comprising the steps of
monitoring a position of said at least one movable wall section, comparing said position with a predetermine threshold position;
deciding to stop the movement of the actuator when the position exceeds the threshold position.

In the prior art, methods for controlling the density of packages have been consequently implemented by steering the movable wall section based on force, meaning that a force measurement is used to decide upon movement of the actuators moving the movable wall section. The method according to the invention adds position-based-steering steps to the conventional force-based-steering steps. This provides multiple advantages, as will be explained hereunder. The movable wall section can be prevented from being moved over a predetermined position. The position monitoring step and corresponding comparing and deciding step provide a simple technical solution to allow the density control system to work correctly according to established techniques but without the risk of the density control system damaging the movable wall section. Furthermore with a position-based-steering of the movable wall section, it is possible to influence the final shape of the bale produced in the baling chamber.

Preferably, the method further comprises the steps of:
measuring a reaction force of the crop material on a segment of the baling chamber via a load sensor,
generating an output indicative of said reaction force, and steering the actuators in response to the generated output.

These further method steps provide the density control system with force-based-steering steps to control the density of the package. Depending on the reaction force of the crop material, the actuators are steered to move the movable wall section to thereby change the compression force exerted on the crop material and needed to push the package of crop material further through the baling chamber.

BRIEF DESCRIPTION OF THE DRAWINGS

A density control system in accordance with the present invention will now be described in further detail, by way of example, with reference to the accompanying drawings, in which.

The terms "front", "rear", "forward", "rearward", "left" and "right" used throughout this description are determined with respect to the normal direction of travel of the machine in operation. However they are not to be construed as limiting terms.

DETAILED DESCRIPTION OF PREFERRED EMBODIMENTS

Figure 1:
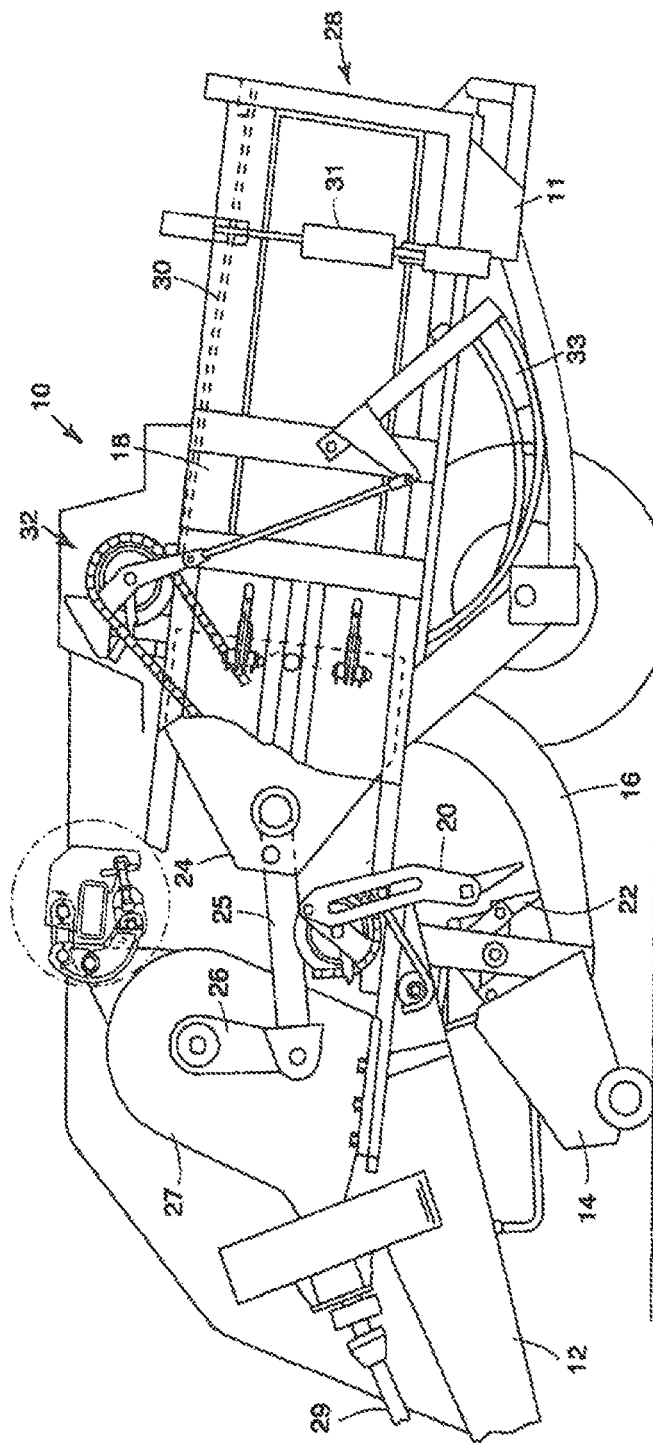
FIG. 1 is a diagrammatical, partly sectional side view of a rectangular baler.

FIG. 1 shows an agricultural baler 10 comprising a main frame 11 which is equipped with a forwardly extending tongue 12 provided at its front end with hitch means (not shown) for coupling the baler 10 to a towing tractor. A pick-up assembly 14 lifts windrowed crop material off the field as the baler 10 is traveled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means (not shown) for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 under action of a pair of connecting or pitman rods 25 which are linked to the crank arms 26 of a gearbox 27 driven by a transmission shaft 29 which is connected to the PTO shaft of the tractor. The reciprocating plunger 24 pushes each new charge introduced into the baling chamber 18 rearwardly and forms the subsequent charges into a parallelepiped package of crop material, which is forced by the same action of the plunger 24 toward a rearmost discharge aperture 28 of the chamber.

The baling chamber 18 comprises at least one movable wall portion 30 of which the position can be adjusted to vary the cross section of the aperture 28. Reduction of this cross section will increase the resistance to rearward movement of the crop packages and hence increase the density of the crop material contained therein. Similarly an enlargement of the cross section will reduce said resistance to rearward movement and hence equally reduce the density of the newly formed packages. The position of the wall portion 30 is controlled by actuator means comprising of a pair of hydraulic cylinders 31 (only one shown in FIG. 1) which are installed between the frame 11 and the wall portion 30.

In FIG. 1, the movable wall portion 30 is shown as portion of the top wall of the baling chamber. Other embodiments, with different positions of movable wall portion can also be implemented. In another preferred embodiment, there are two movable wall portions 30 positioned in two longitudinal sidewalls of the baling chamber. These movable sidewall portions are movably suspended and coupled to a hydraulic cylinder for actuating the movement of these sidewall portions. In a more preferred embodiment, both the sidewalls and the top wall and optionally the bottom wall comprise movable wall portions. The movable topwall portion and the movable sidewall portions can be movably suspended and connected to a hydraulic cylinder via a suspension element connecting a movable topwall portion with a movable sidewall portion and one end of a hydraulic cylinder in such a manner that a movement of the hydraulic cylinder results in a movement of both the movable topwall portion and the movable sidewall portion.

Before leaving the confines of the baler 10, each package is securely bound in its final compacted form by a tying mechanism 32. The length of each bale produced by the baler 10 can be adjustably predetermined by conventional means not shown. The tying mechanism 32 comprises a series of periodically actuated needles 33 which are normally stationed in a stand-by condition below the chamber 18 but which, when actuated, swing upwardly through and across the baling chamber 18 to present twine to a corresponding series of knotters positioned on top of the chamber 18 and extending across the width of the latter.

The general purpose of an agricultural baler is to obtain a package of crop material, whereby the package has a predetermined density. By increasing the density of the package, more crop material can be stored in a cubic meter of space. As transport costs and storing costs increase over time, it is a general desire to obtain packages of crop material with a higher density. However, ideal storing condition can differ from crop material to crop material, so that not all crop material is ideally pressed into high density packages. For example crop material with a high moisture percentage is ideally pressed into bales having a not too high density. Very dry crop material can be pressed into very high density bales.

Preferably, the baler is a high density baler meaning that the force exerted on the crop material in the baling chamber is higher than conventional. Conventional balers can exert forces of about 400 kN on the crop material in the baling chamber. A high density baler is provided to exert a force of about 600 kN or of about 700 kN on the crop material in the baling chamber. With these forces, bales with higher density can be obtained so that more crop material can be stored in a cubic meter of space resulting in lower overall storing and transporting costs.

To obtain the predetermined density, a force is defined by which the density can be obtained. Thereby the known relationship between crop material, force and density is used to determine which force is needed for a known crop material to obtain a predetermined density. This determined force is then exerted on the crop material inside the baling chamber to produce a package by pressing the crop material together with this predetermined force. This force can be measured by a load sensor measuring the reaction force of the crop material on the baling chamber. An example of such load sensor is a sensor for measuring the force exerted by the plunger on the crop material, or a sensor for measuring via a load cell mounted inside the baling chamber for measuring the reaction force of the crop material on the baling chamber wall, or can be determined otherwise. Based on the deviation of the measured force and the predetermined force (to obtain the predetermined density), the movable wall sections are steered. As an example, when the measured force is lower than the predetermined force, the movable wall sections are steered to move inward, thereby making the aperture at the end of the baling chamber smaller as a result of which a higher force will be needed to compress the package and push the packager through the baling chamber. As another example, if the measured force is higher than the predetermined force, the movable wall sections are moved outward so that the aperture at the end of the baling chamber is wider, so that the package of crop material is pushed through the baling chamber easier, so that less force is needed. Such density control system is known, and is in this application referred to as a force-based steering of the movable wall sections.

The invention provides in a position-based steering of the movable wall portions, which has several advantages with respect to force based steering. To obtain a position-based steering, the position of the movable wall portion is measured. The measured position is then compared via a comparator with a predetermined position. In an example, the predetermined position is defined as a final inward position, a final outward position, or another position where further operating of the movable wall portion would or could involve a risk. A decision module is provided to decide to stop the actuators connected to the movable wall portion, to thereby stop the further movement of the movable wall portion. This stopping of the actuator is solely based on the position of the movable wall sections, therefore referred to as position-based steering. By stopping the movement of the movable wall section, damage to the movable wall section to the baling chamber or to other components of, or related to the baler, can be avoided.

A positioned sensor can be placed at various different locations in the baling chamber. In an example, the positioned sensor is formed as an angular positioned sensor, placed at the hinge where the movable wall section is rotatable connected to the baling chamber or baler frame. In another example, the actuators, for example hydraulic cylinders, actuating the movable wall section are provided with position sensors so that the position of the cylinder or actuator can be read out. Thereby, a relation between the position of the cylinder and the position of the movable wall section is used to determine the latter. In another example, an optical position sensor is used to determine the distance between the movable wall section and a reference point at the baler frame. A combination of the different above mentioned sensors, or multiple of such sensors, can be placed at the movable wall sections to measure the position of these movable wall sections. Preferably, the movable wall sections are rotatably connected to the baler frame via a hinging mechanism, and the positioned sensor is formed as an angular position sensor placed at the hinging mechanism. When multiple movable wall sections are provided in the baler, each of these movable wall sections is provided with at least one position sensor measuring the position of each respective movable wall section.

The movable wall sections are in practice suspended so that the movable wall sections can move between a first and a second final position. The most inward final position is referred to as inner final position, and the most outward final position is referred to as the outer final position, whereby outer and inner is used in relation to the center of the baling chamber. The aperture located near the end of the baling chamber, is small when the movable wall sections are in their inner final position, and the aperture is large when the movable wall sections are in their outer final position. It will be clear to a skilled person that moving a movable wall section further than a final position could damage the hinging mechanism, the movable wall section, the baling chamber, the baler frame, or a combination of the above mentioned elements. In practice, the final position of the movable wall portion and the final position of an actuator such as a hydraulic cylinder cannot always be arranged to perfectly correspond to one another. Therefore in practice, to be able to operate the movable wall section over its full range, from one final to another final position, the moving range of a hydraulic cylinder or other actuator actuating the movable wall section is preferably larger and fully overlapping with the movable wall section range of movement. As a result, an actuator could move a movable wall section further than its final position, thereby damaging the movable wall section. Considering the forces that are needed to compress a package of crop material into a package, especially when the package is a high density package, it will be understood by the skilled person that the actuators could exert a high force on the movable wall portion in its final position. Tests have proven that, in a high density baler, the actuator is strong enough to break the movable wall section mechanism, thereby breaking the baler. Using only force-based-steering of the movable wall sections cannot prevent this situation, therefore the invention provides in an additional position-based-steering of the movable wall section.

Figure 2:
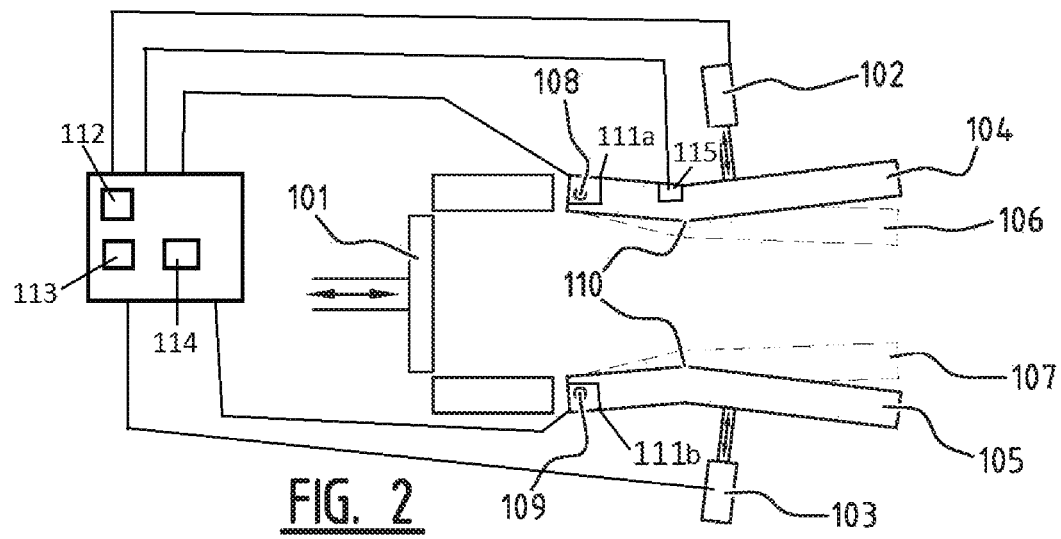
FIG. 2 is a top view illustration of a baling chamber according to an embodiment of the invention.

In the further description, the invention is explained with reference to the FIGS. 2 and 3, showing two movable side wall portions. It will be clear however, that these principles explained in relation to side wall portions are also applicable to a movable top wall portion or other movable wall portion in the baling chamber which are capable of changing the aperture through which the package of crop material is pushed. It is also mentioned that although the effects of the invention are illustrated with two movable side wall portions, these effects are equally present when using only one movable wall portion. The invention is therefore not limited to a baling chamber having two movable wall portions.

FIG. 2 shows a top view illustration of the principal working of a baling chamber. Thereby FIG. 2 shows that plunger 101 which is provided to reciprocally move in the baling chamber thereby pressing new amounts of crop material in and through the baling chamber. For clarity purpose it is mentioned that the left hand side of the drawing shows the front side of the baler and the right hand side of the figure shows the rear section of the baler with the aperture through which the packages of crop material exit the baling chamber. The baling chamber comprises two movable side wall sections 104, 105, which are connected to the baler frame via hinging mechanisms 108, 109 respectively. Each of the movable wall sections is operated via an actuator 102, 103. Each movable wall section is bent 110 so as to create a compression and subsequent partial discharging of crop material being moved through the baling chamber. The FIG. 2 furthermore shows the final inward position 106, 107. Preferably an angular position sensor (not shown) is mounted at each of the hinging mechanisms 108, 109. In a preferred embodiment of the invention, the baler comprises at least two movable wall sections, each movable wall section being operated via an actuator, and each movable wall section having a positioned sensor to measure the position of the respective movable wall section.

The position sensor measuring the position of the movable wall part is preferably configured to measure the relative position of the movable wall part with respect to a predetermined neutral (zero-point) position. This neutral position can for example be the center angular position of the movable wall section, or the final outer position of the movable wall section. In another example, where the position of the movable wall section is measured in units of distance (instead of angle), the center point of the baling chamber can be defined as neutral position. Such relative measurement allows an easy comparison of one movable wall sections position with another movable wall sections position.

Figure 3A:
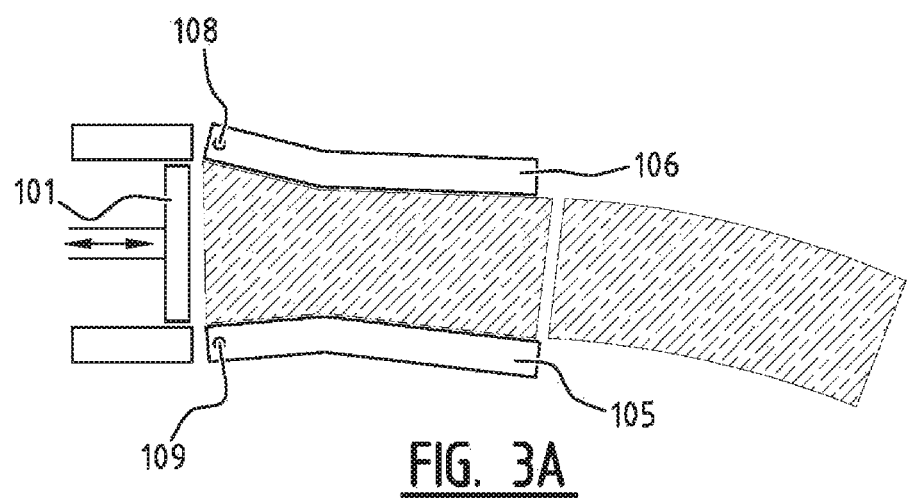
FIG. 3 is an illustration of the effect of the moving wall section positions on the shape of the resulting bale.
Figure 3B:
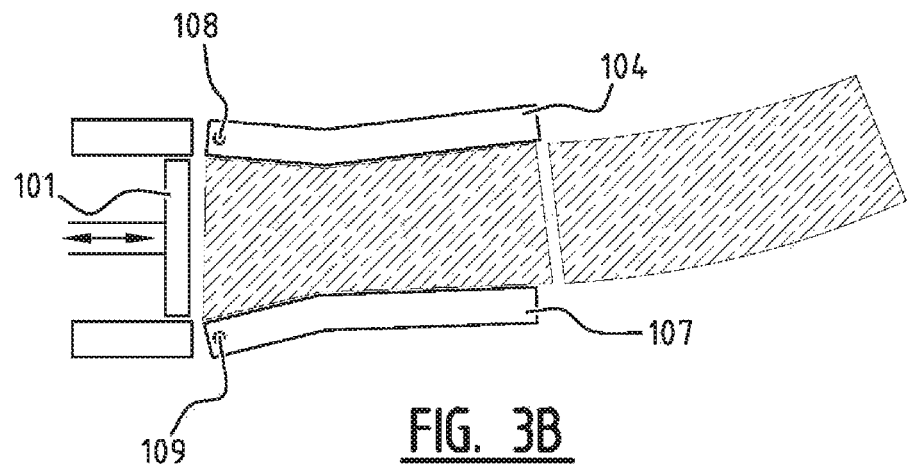

FIG. 3 shows the effect of a deviation of relative position of one movable side wall section with respect to the other movable side wall section. In FIG. 3a, the movable wall section shown on the top of the figure is moved more inward than the movable wall section shown at the bottom of FIG. 3a, resulting in an asymmetrical pressure being exerted on the crop material inside the baling chamber. As a result, the package coming out of the baling chamber will have a curved form as can be seen in FIG. 3a. FIG. 3b shows an analogue situation, but where the movable side wall portion at the top of the figure is more outward than the movable side wall portion at the bottom of the FIG. 3b, and shows how the package formed in the baling chamber bends as a result of the deviation in position of the movable wall sections. The bended packages of crop material are not easy to stack and transport. Such situation and positioning of movable wall sections is easy to correct after a position measurement. Since position sensors, and a comparator and decision module is already present according to the invention, this comparator can be used to compare the position of one movable wall section with the position of a second movable wall section to determine deviation between two movable wall sections. If the deviation is higher than the predefined deviation, at least one of the movable wall sections is steered so that the deviation between the two movable wall sections is decreased. Thereby situation as illustrated in FIGS. 3a and 3b can be easily and early recognized, so that the baler does not produce packages that are curved.

The present invention allows to further automate balers, meaning that the input of the operator operating the baler is decreased. With the position-based steering mechanism build in the density control system, the density control system can be activated as from start up, when no crop material is present in the baling chamber. The density control system will, as a result of the low density inside the baling chamber, steer the actuators to move the movable wall sections to its most inward position. Because of the position-based steering, the actuators will not move the movable wall sections further than their final inward positions, as the position based steering will stop the actuators. This gives the baler time to fill the baling chamber with crop material and to build up a pressure inside the baling chamber, pushing the movable wall sections outward, after which the force-based steering of the density control system will take over the steering of the density of the baling chamber, so that the predetermined density can be obtained. In prior art balers, two situations could occur. In a first situation, the forces transmitted by the actuators to the movable wall sections are not so high that they have the power to break the movable wall section. In this situation, the density of the package producible by the baler is limited as also the force that can be applied to the package is limited. In a second situation, where a higher force can be applied to the movable wall sections, the operator must switch the density control system off when the baling chamber is empty, otherwise the actuator would push the movable wall section over its final inward position as a result of the low force measured inside the baling chamber, as it is empty. This would damage the baler.

Figure 4:
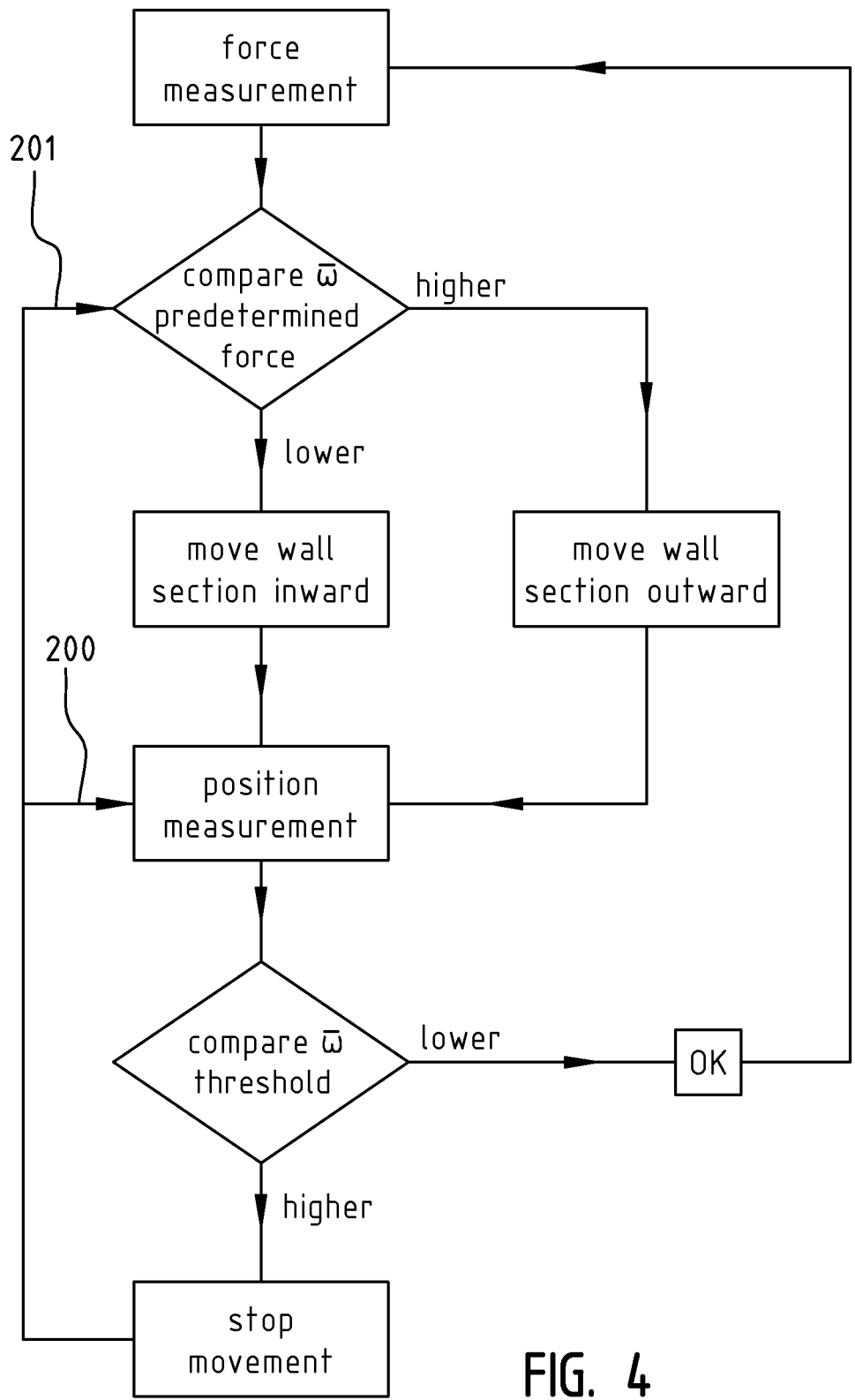
FIG. 4 is a flowchart of a method according to a preferred embodiment of the invention.

FIG. 4 shows a flowchart of the density control system implementing both a position-based steering and a force-based steering. The flowchart starts with a forced measurement, after which the measured force is compared with a predetermined force. If the comparison results in the measured force being lower (or higher) than the predetermined force, the movable wall section is moved more inward (or outward), to decrease (or increase) the aperture at near the end of the baler as a result of which force needed to push the package through the baler will be higher (or lower). Then a position measurement is conducted, after which the measured position is compared with a threshold position. If the comparison shows that the measured position does not exceed the threshold position, the decision module decides that the movable wall section is still operating in a safe zone (ok), and allows a further force measurement. If the comparison of the measured position shows that the measured position exceeds a threshold position, the movement of the actuators is stopped as the density control system decides that the system is operating the movable wall section in a risk zone. Thereby, it can be implemented that the movement is stopped and the movement can only be started in the opposite direction whereby the movable wall section is moved away from the threshold position, shown by arrow 201. Preferably, position measurement is still conducted, shown via arrow 200, because the baler could de-block itself by pushing crop material in the baling chamber via the plunger. By pushing crop material in the baling chamber via the plunger, the reaction force of the crop material inside the baling chamber is build up and could become high enough to push the movable wall sections outward. A position measurement could detect that the movable wall sections are pushed out of their final position, so that the density control system can conduct a further force measurement and corresponding movement of the movable wall section.

The invention claimed is:

1. A density control system for an agricultural baler, which comprises a baling chamber comprising a plurality of walls including at least one movable wall section, an intake duct leading into the baling chamber, and a plunger for compressing charges of crop material to a package in the chamber, an actuator for adjusting a position of the at least one movable wall section in response to an output of the density control system in order to vary a density of said package, wherein the density control system comprises a sensor configured for measuring the position of the at least one movable wall section, a comparator configured for comparing said position with a threshold position and a decision module configured to stop the movement of the actuator when the position exceeds the threshold position.

2. The density control system according to claim 1, wherein the threshold position represents a predetermined final inward position of the movable wall section.

3. The density control system according to claim 1, wherein a further sensor configured for measuring a further position of a further movable wall section is provided, and wherein the threshold position is the further position to thereby determine a deviation of position of one with respect to another movable wall section, whereby the decision module is further configured to steer the actuator to decrease said deviation.

4. The density control system according to claim 1, further comprising a load sensor measuring a reaction force of the crop material on the baling chamber and generating an output indicative of said reaction force, and comprising a steering module for steering the actuator to move the at least one movable wall section in response to said output.

5. The density control system according to claim 1, wherein the agricultural baler is a high density square baler.

6. An agricultural baler comprising:
a baling chamber comprising a plurality of walls including at least one movable wall section, a crop feeder for introducing charges of crop material into the baling chamber, a plunger for compressing the charges to a package of the crop material in the chamber, a density control system configured to vary a density of said package, and an actuator for adjusting a position of the at least one movable wall section in response to an output of the density control system,
wherein the density control system comprises a sensor configured for measuring the position of the at least one movable wall section, a comparator configured for comparing said position with a threshold position and a decision module configured to stop the movement of the actuator when the position exceeds the threshold position.

7. A method for controlling a density of packages of crop material in an agricultural baler, which comprises:
a baling chamber comprising a plurality of walls including at least one movable wall section,
a crop feeder for introducing charges of crop material into said baling chamber a plunger for compressing the charges to a package of the crop material in the chamber,
an actuator for adjusting a position of the at least one movable wall section in response to an output of a density control system in order to vary the density of said package;
the method comprising the steps of
monitoring a position of said at least one movable wall section via a position sensor,
comparing said position with a predetermine threshold position;
deciding to stop the movement of the actuator when the position exceeds the threshold position.

8. Method according to claim 7, wherein the method further comprises the steps of:
measuring a reaction force of the crop material on the movable wall section via a load sensor,
generating an output indicative of said reaction force, and
steering the actuator in response to the generated output.

* * * * *